Dec. 21, 1943.    J. I. CANTRAL    2,337,026
TOOL HOLDER
Filed May 3, 1941

INVENTOR
John I. Cantral
BY
ATTORNEYS

Patented Dec. 21, 1943

2,337,026

UNITED STATES PATENT OFFICE 2,337,026

TOOLHOLDER

John I. Cantral, Moline, Ill., assignor to Deere & Company, Moline, Ill., a corporation of Illinois Application May 3, 1941, Serial No. 391,742

4 Claims. (Cl. 97—183)

The present invention relates to agricultural implements and more particularly to tools and holders therefor.

The object and general nature of this invention is the provision of a new and improved safety trip device for ground working tools and the like. More particularly, it is a feature of this invention to provide a safety trip for lister and middle-breaker bottoms, so constructed and arranged that when the bottom encounters an obstruction, it is automatically tripped, thereby permitting the bottom to fold under, thus preventing serious damage. According to the present invention, it is then only necessary for the operator of the implement to back and the bottom will then automatically snap back to its normal position.

Heretofore, spring trips and friction trips have been provided, particularly for cultivator shovels, but in such devices it has been found that the action has been objectionably variable, due to the use of rollers and other parts operating over exposed surfaces where the presence of rust, dirt, grit and the like introduces variables which seriously affect the responsiveness of the trip so that in prior art devices the trips sometime operate when it is not desired that they should do so and, under other conditions, the trip does not operate even though the tool meets with a large obstruction, thus resulting in damage to the machine.

A more specific feature of the present invention is the provision of a safety trip device in which all relatively movable parts are well protected to the extent that dust, dirt and the like, or rust, can have practically no effect so far as varying the responsiveness of the trip device is concerned.

A particular feature of this invention is the provision of a pair of pivotally interconnected links formed with interengaging cam surfaces in contact with one another and held in that position resiliently so that when excessive forces are encountered the cam surfaces separate and permit the tool or tools to pass over the obstruction. The particular advantage of having the cam surfaces in contact with one another is that there is little chance for dirt and dust to get in between the surfaces and affect their operation. A further particular feature of this invention is the use of blocks of rubber or rubber-like material as the resilient elements. Not only do such blocks provide the required resilience but they also provide a compact arrangement, taking up much less space than springs, and further, they are not clogged by mud, dirt and the like. In effect, the rubber blocks protect the pivots from dirt and moisture and since the cam surfaces are always in engagement, it will be seen that the unit I have provided is not only more compact and rugged than prior constructions, but retains its uniformity of action over a long period of time, thus it standing ready to respond instantaneously to those abnormal conditions to which the unit is designed to respond.

These and other objects and advantages of the present invention will be apparent to those skilled in the art after a consideration of the following detailed description, taken in conjunction with the accompanying drawing illustrating the preferred form.

Figure 1:
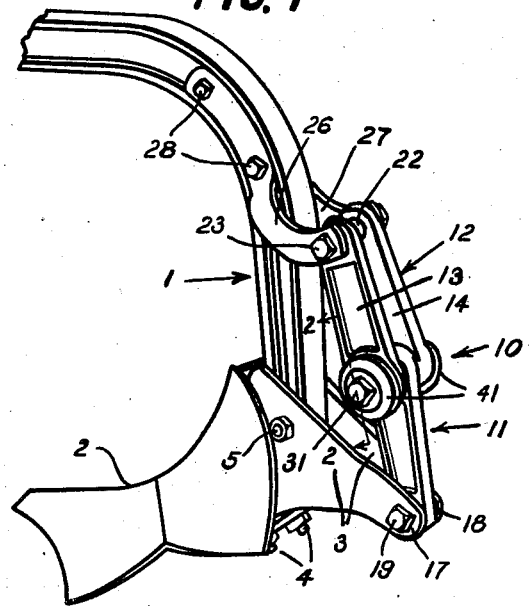
Figure 1 is a perspective view of a lister bottom equipped with a safety trip constructed according to the principles of the present invention.

Referring now to the drawing, more particularly to Figure 1, the reference numeral 1 indicates a tool supporting beam to the rear or lower end of which is connected a lister bottom 2. Preferably, the lister bottom is connected for pivotal movement relative to the lister beam 1, and to this end I provide a pair of plates 3 to which the lister bottom is secured, as by a pair of bolts 4. The plates are disposed in spaced apart relation, one on each side of the lower end of the tool supporting beam 1. The plates 3 are apertured to receive a pivot bolt 5 that passes through a hole in the lower end of the beam 1 and serves as a pivot by which the lister bottom or middle-breaker bottom 2 is connected for pivotal movement to the tool supporting beam 1. The plow bottom 2 is shown in its normal or operating position in Figure 1, and it is held in that position by a safety trip device that is indicated in its entirely by the reference numeral 10 and which constitutes the principal part of this invention. Briefly, the safety trip device 10 is connected between the rear ends of the plates 3 and the beam 1 so as to yieldingly restrain the plow bottom 2 from swinging downwardly and rearwardly about the pivot 5 until the tool encounters an abnormal load, such as a heavy rock, stump or large root. Then the safety trip 10 releases and permits the bottom 2 to swing downwardly and rearwardly, thus preventing serious damage to the implement.

The safety trip device 10 includes two link members 11 and 12. The lower link 11 consists of a single member while the upper member 12 consists of a pair of links 13 and 14 that are disposed at their lower ends on opposite sides of the upper end of the lower link 11. For pivotally receiving the lower end of the lower link 11 the plates 3 have rearward extensions 17 and 18 that are apertured to receive a bolt 19. The latter carries a bushing (not shown) that extends through an opening in the lower end of the link 11, whereby the latter is mounted for swinging movement relative to the plates 3. The upper ends of the two upper links 13 and 14 are apertured and receive a bushing 22 through which a bolt 23 extends. A pair of strap members 26 and 27 are bolted, as at 28, to the beam 1 and together serve as a bracket pivotally receiving the bolt 23 and bushing 22. The latter is of such a length that when the bolt 23 is drawn up tight the bushing 22 is held against rotation and serves to pivotally receive the upper ends of the upper links 13 and 14.

Figure 2:
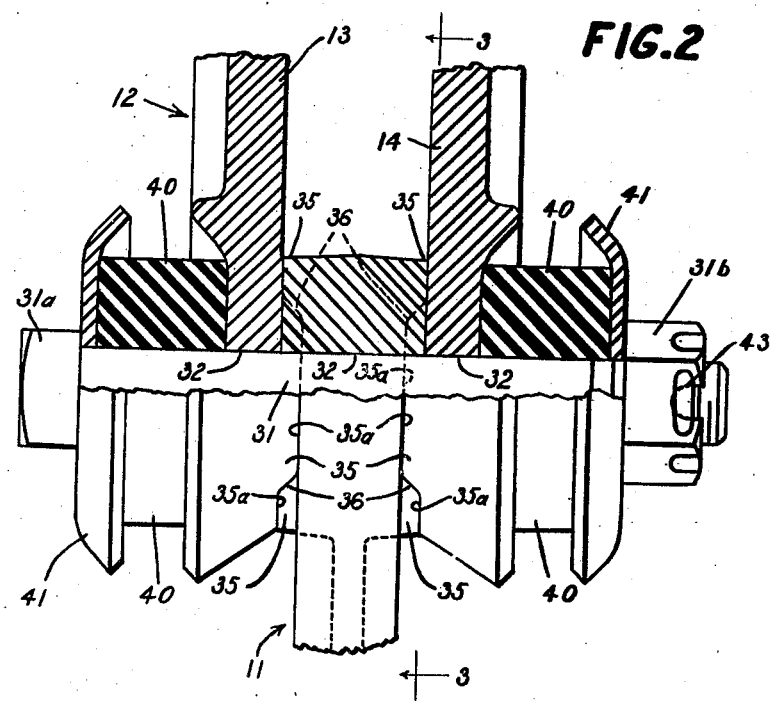
Figure 2 is a view, the lower part of which is in elevation and the upper part being a sectional view taken substantially along the line 2—2 of Figure 1.

As best shown in Figures 1 and 2, the two link members 11 and 12 are pivotally connected together by a bolt 31 which extends through the inner ends of all of the links 11, 12, 13 and 14, the links being apertured, as at 32 (Figure 3), to receive the bolt 31.

Figure 3:
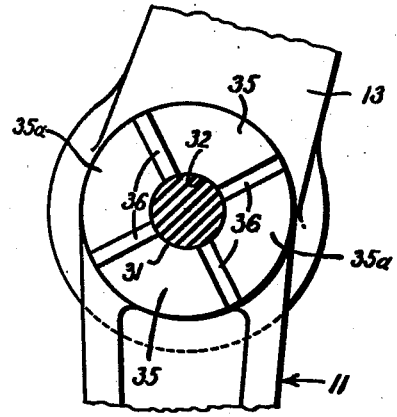
Figure 3 is a face view of a cam section formed on one of the links, taken along the line 3—3 of Figure 2.

The interengaging faces on opposite sides of the upper end of the lower link 11 and the adjacent portions of the lower ends of the upper links 13 and 14 are formed with 90 degree cam lugs, each indicated by the reference numeral 35 in Figure 3. These cam lugs 35 are so formed that for any two lugs on one member the spaces 35a therebetween are adapted to receive the lugs 35 on the adjacent cam section of the associated link. The space or surface 35a is connected with the adjacent edges of the cam lugs by inclined cam faces 36, which lie at an angle so that when the link members are forced to swing angularly one relative to the other and are permitted to separate, the cam lug on one member rides upon the cam lug of the other member. Normally, however, each pair of cam lugs are disposed in inter-fitting relation between the cam lugs on the associated member, as best shown in Figure 1.

The interengaging cam faces are yieldingly held in engagement by resilient means which, by virtue of resisting the laterally outer movement of any one link member relative to the other, effectively resists the swinging movement of the plow bottom 2 relative to the supporting beam, this being so because the lower link 11 is pivoted at 19 to the bottom supporting plates 3 and the link member 12 is pivoted at 23 to a bracket fixed to the beam 1. A block 40, preferably formed of resilient rubber or rubber-like material, is disposed between the outer face of each of the upper links 13 and 14 and a cap 41 on the bolt 31, the resilient blocks serving as resilient means yieldingly holding the cam faces in engagement. One cap 41 is disposed under the head 31a of the bolt 31 while the other cap 41 is disposed under the nut 31b which preferably is castellated so as to permit the nut 31b to be adjusted to impose different degrees of compression on the blocks 40, such adjustment being retained by virtue of a cotter 43 carried at the outer threaded end of the bolt 31.

As best shown in Figure 3, the cam lugs 35 on the link members are so placed that when the cam lugs are in inter-fitting or nested relation, the two link members 11 and 12 are held in a position in which one member is disposed at an angle of approximately five degrees from an extended straight line relation. This angle may, of course, vary as desired.

The operation of the safety trip constructed as described above, is as follows:

Under normal conditions the parts are arranged as illustrated in Figure 1, the two members 11 and 12 of the safety trip being disposed at the angle shown in Figure 3 so that the force exerted by the resilient blocks 40 is sufficient to hold the cam faces in engagement and thus preventing the beam from swinging about the pivot 5. If, however, the point of the bottom strikes an obstruction, such as a rock, stump or the like, or gets caught under a root or other object, the draft pull applied to the bottom at the pivot 5 exerts a force which causes the bottom to swing downwardly and rearwardly, which carries the pivot 19 upwardly and thus swings one of the safety trip members 11 and 12 relative to the other, this relative movement taking place by virtue of the compression in the resilient blocks 40 being overcome when one set of cam lugs 35 is forced to slide up onto the other set, thus spreading the lower ends of the links 13 and 14 a certain amount. The responsiveness of the safety trip may be adjusted by tightening or loosening the nut 31b. Thus, when the bottom encounters an obstruction it is automatically tripped, permitting the bottom to fold under and preventing any serious damage to the implement. To restore the bottom 2 to operating position it is necessary only for the operator to back the tractor whereupon the bottom will automatically snap back to its normal position, as shown in Figure 1. The dispostion of the cam lugs 35 on the link members is such that their normal inter-fitting engagement disposes the safety trip members 11 and 12 at the proper angle, namely, about five degrees from a straight line.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural implement including a pair of relatively movable parts whose relative movement it is desired to restrain until an overload condition is reached, overload trip mechanism comprising a pair of pivotally interconnected links connected, respectively, with said parts, interengaging cam means on said links concentric with the pivot axis of their interconnection, said cam means including cam sections of relatively small angular extent and dwell sections of relatively large angular extent, and resilient sections yieldably holding the interengaging cam means in engagement so as to restrain relative movement of said parts until an overload occurs, said dwell sections of the links being forced into engagement upon the occurrence of an overload, whereby said resilient means is ineffective to restrain relative movement of said parts until the latter are restored to their normal position.

2. In an agricultural implement including a pair of parts connected together for movement one relative to the other, a pair of links pivotally connected, respectively, at their outer ends with said parts, interengaging cams on said links arranged so that the latter are normally held in nearly a straight line relation, a bolt pivotally connecting the inner ends of said links together for movement relative to each other about an axis, a pair of resilient members disposed on said bolt on opposite sides of said links, and cap members on said bolt at the outer ends of resilient members, tightening the bolt acting through said cap members for compressing said resilient members and tending to hold said cam sections in engagement, the straight line relation of said links and said resilient members serving to resist movement of one of said implement parts relative to the other under normal load conditions but yielding under an overload.

3. In an agricultural implement including a pair of relatively movable parts whose relative movement it is desired to restrain, a first link pivoted to one of said parts and having at one end a cam section at each side thereof, a pair of links disposed on opposite sides of said first link and each having a cam section cooperating with the cam section at that side of said first link, said pair of links being pivoted to the other of said parts, means pivotally connecting the cam ends of said links, and resilient means acting against said pivotally interconnected links and cooperating with said interengaging cam means for holding said links against relative movement, said cam means being so disposed angularly that said links are held normally in nearly dead center relationship so as to restrain relative movement of said parts and to yield only under an overload.

4. In an agricultural implement including a pair of relatively movable parts whose relative movement it is desired to restrain, an overload release device comprising a pair of pivotally interconnected links connected, respectively, with said parts, interengaging cam means on said links, and resilient means acting axially against said pivotally connected links, each of said cam means having an angular face formed at a substantially constant angle with respect to the plane of relative movement of said links, whereby said resilient means acts through said links to prevent all relative movement of said implement parts until an overload occurs.

JOHN I. CANTRAL.

CERTIFICATE OF CORRECTION.

Patent No. 2,337,026.　　　　　　　　　　　　　　December 21, 1943.

JOHN I. CANTRAL.

It is hereby certified that error appears in the printed specification of the above numbered patent requiring correction as follows: Page 2, second column, line 66, claim 1, for "sections" read --means--; line 67, for "means" read --sections--; and that the said Letters Patent should be read with this correction therein that the same may conform to the record of the case in the Patent Office.

Signed and sealed this 29th day of February, A. D. 1944.

Leslie Frazer (Seal)　　　　　　　　　　　　　　Acting Commissioner of Patents.